(12) United States Patent
Sakae

(10) Patent No.: US 8,544,310 B2
(45) Date of Patent: Oct. 1, 2013

(54) METHOD OF MOLDING FORGED PRODUCT FROM ROUGHLY SHAPED MATERIAL

(75) Inventor: Akira Sakae, Kobe (JP)

(73) Assignee: Kobe Steel, Ltd., Kobe-shi (JP)

( * ) Notice: Subject to any disclaimer, the term of this patent is extended or adjusted under 35 U.S.C. 154(b) by 0 days.

(21) Appl. No.: 13/597,340

(22) Filed: Aug. 29, 2012

(65) Prior Publication Data

US 2012/0318033 A1    Dec. 20, 2012

Related U.S. Application Data

(63) Continuation of application No. 12/091,180, filed as application No. PCT/JP2006/319305 on Sep. 28, 2006, now abandoned.

(30) Foreign Application Priority Data

Nov. 8, 2005    (JP) .................................. 2005-323774

(51) Int. Cl.
*B21D 22/00*    (2006.01)
*B21C 23/00*    (2006.01)

(52) U.S. Cl.
USPC .................... 72/356; 72/254; 72/256; 72/260

(58) Field of Classification Search
USPC ............................ 72/254, 255, 256, 260, 356
See application file for complete search history.

(56) References Cited

U.S. PATENT DOCUMENTS

| | | |
|---|---|---|
| 1,089,389 A | 3/1914 | Bell |
| 1,211,818 A | 1/1917 | Bradley |
| 2,150,416 A | 3/1939 | Cairns |
| 2,231,336 A | 2/1941 | Aherne |
| 2,899,053 A | 8/1959 | Govan |
| 3,422,648 A | 1/1969 | Lemelson |
| 3,585,834 A | 6/1971 | De Bruyn et al. |
| 5,127,253 A | 7/1992 | Takahara et al. |

(Continued)

FOREIGN PATENT DOCUMENTS

| | | |
|---|---|---|
| CN | 85 1 00360 A | 8/1986 |
| JP | 62-166044 | * 7/1987 |

(Continued)

OTHER PUBLICATIONS

European Search Report issued Jul. 12, 2010 in PCT/JP2006319305.

(Continued)

*Primary Examiner* — Edward Tolan

(74) *Attorney, Agent, or Firm* — Oblon, Spivak, McClelland, Maier & Neustadt, L.L.P.

(57) ABSTRACT

A forged product having thick end parts, and a thin part between the thick parts, is formed by extruding a forging stock such that the cross section of the forging stock varies along the direction of extrusion, wherein in any cross section in a direction perpendicular to the direction of extrusion, the forging stock has two thick end parts, a thin part intermediate the end parts and transitional parts with varying thickness between the thin part and each of the thick end parts; cutting the forging stock in the direction perpendicular to the direction of extrusion to form cut portions; and forging each of the cut portions such that the thick end parts of the cut portions form the thick end parts of the forged product and the thin part of the cut portions forms the thin part of the forged product.

1 Claim, 11 Drawing Sheets

(56) References Cited

U.S. PATENT DOCUMENTS

| | | | |
|---|---|---|---|
| 5,321,967 A | 6/1994 | Wakabayashi | |
| 5,544,413 A | 8/1996 | Stevens et al. | |
| 5,557,962 A | 9/1996 | Takikawa | |
| 5,775,155 A | 7/1998 | Kato et al. | |
| 7,296,454 B2 * | 11/2007 | Otaki | 72/256 |
| 2004/0255635 A1 | 12/2004 | Ando et al. | |
| 2004/0261918 A1 | 12/2004 | Ando et al. | |

FOREIGN PATENT DOCUMENTS

| | | | |
|---|---|---|---|
| JP | 63-40613 | | 2/1988 |
| JP | 63-40614 | | 2/1988 |
| JP | 63-45355 | * | 2/1988 |
| JP | 3-5037 | | 1/1991 |
| JP | 6-285539 | | 10/1994 |
| JP | 2000-179400 | | 6/2000 |
| JP | 2000-326043 | | 11/2000 |
| JP | 2002-035822 | | 2/2002 |
| JP | 2003-53468 | | 2/2003 |
| JP | 2003-266145 | | 9/2003 |
| WO | WO 93/00183 | | 1/1993 |
| WO | WO 01/60583 | | 8/2001 |

OTHER PUBLICATIONS

Database WPI Section CH, Week 198206 Thomson Scientific, London, GB; M21, AN 1982-11387E XP002588242 "Tool for Pressing Variable Cross-Section Articles" & SU 825 224 A1 (Kolkunov Evgenij A) Apr. 30, 1981 abstract; Figures 1-9.

Office Action issued Apr. 5, 2011 in European Patent Application No. 06 810 752.3-2302.

Takeuchi Masahiko, et al., "Jidousha WO Tsukuru Tanzou Buhin" Sosel to Kako (Nippon Sosel Kako Gakkaishi) (Forged Parts for Automobiles, Plasticity and Working), Journal of the Society of Plastic Working of Japan), vol., 39, No. 455, 1998, pp. 39-44 (with English Translation), Feb. 1998.

* cited by examiner

METHOD OF MOLDING FORGED PRODUCT FROM ROUGHLY SHAPED MATERIAL

CROSS-REFERENCE TO RELATED APPLICATIONS

This application is a continuation of U.S. Ser. No. 12/091,180 filed Apr. 23, 2008, the entire contents of which is incorporated herein by reference. U.S. Ser. No. 12/091,180 is a national stage application of PCT/JP06/319305, filed Sep. 28, 2006. This application also claims priority to Japanese Patent Application No. 2005-323774 filed Nov. 8, 2005.

TECHNICAL FIELD

The present invention relates to a method for forming a forged product from a roughly shaped material.

BACKGROUND ART

Forging stocks in simple shape were commonly used in conventional technologies. An example is disclosed in Patent Document 1 where a cylindrical shape stock is to be forged into a piston of an internal combustion engine. Another example in simple shape is disclosed in Patent Document 2. Further, another example which is shown in Non-Patent Document 1 (FIG. 6) is a cut piece of steel rod as a hot-forging stock for a crankshaft. In hot forging, the steel rod undergoes preforming, finish forming, burr trimming, and coining sequentially.

Patent Document 1

Japanese Patent Laid-open No. 2003-53468 (FIG. 5)

Patent Document 2

Japanese Patent Laid-open No. 2000-179400 (FIG. 15)

Non-Patent Document 1

Takeuchi Masahiko et al., "Jidousha wo tsukuru tanzou buhin" Sosei to Kako (Nippon Sosei Kako Gakkaishi) [Forged parts for automobiles, Plasticity and Working], Journal of the Society of Plastic Working of Japan], Vol. 39, No. 455, pp. 29-34.

Conventional forging stocks in simple shape (such as cylinder) are available at comparatively low prices. However, they pose a problem with low yields due to a large amount of burrs resulting from forging.

DISCLOSURE OF THE INVENTION

According to a feature of the invention, a method of forming a forged product having thick end parts and a thin part between the thick parts comprises steps of extruding a forging stock such that the cross section of the forging stock varies along the direction of extrusion, and wherein in any cross section in a direction perpendicular to the direction of extrusion, the forging stock has two thick end parts, a thin part intermediate the end parts and transitional parts with varying thickness between the thin part and each of the thick end parts; cutting said forging stock in the direction perpendicular to the direction of extrusion, to form cut portions, each of which has two thick end parts, a thin part intermediate the end parts and transitional parts with varying thickness between the thin part and each of the thick end parts; and forging each of the cut portions such that the thick end parts of the cut portions form the thick end parts of the forged product and the thin part of the cut portions forms the thin part of the forged product.

According to another feature of the invention, a method of forming a forged product having thick end parts and a thin part between the thick parts comprises steps of extruding a forging stock such that the cross section of the forging stock varies along the direction of extrusion to provide alternating thick parts and thin parts along the direction of extrusion; cutting said forging stock at each of said thick parts and in the direction perpendicular to the direction of extrusion, to form cut portions, each of which has two thick end parts, a thin part intermediate the end parts and transitional parts with varying thickness between the thin part and each of the thick end parts; and forging each of the cut portions such that the thick end parts of the cut portions form the thick end parts of the forged product and the thin part of the cut portions forms the thin part of the forged product.

illustrating a second parallel part being extruded, (d) illustrating an oppositely oblique part being extruded, (e) illustrating again a first parallel part being extruded.

Figure 16:
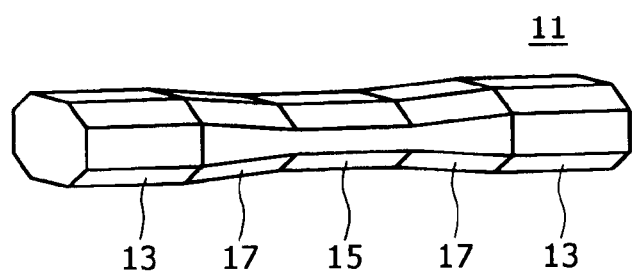

FIG. 16 is a perspective view (like FIG. 13) showing the forging stock pertaining to another embodiment of the present invention.

Figure 17:
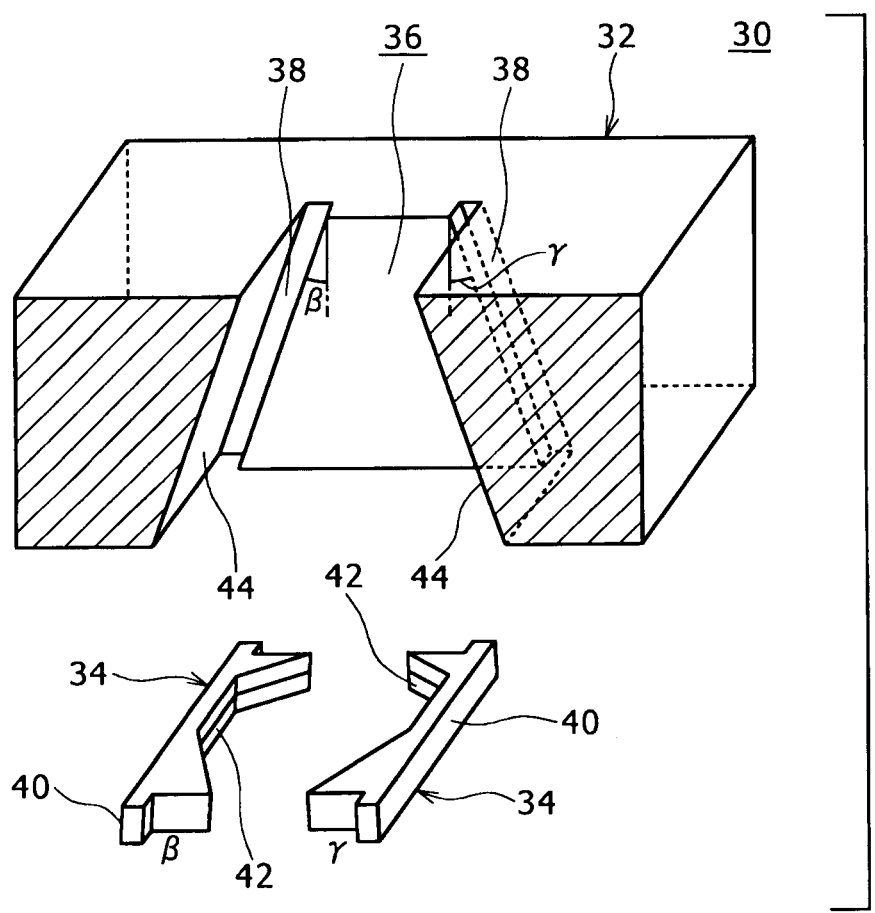

FIG. 17 is a perspective view showing a fixed die and movable dies installed in the apparatus used to form the forging stock.

Figure 18:
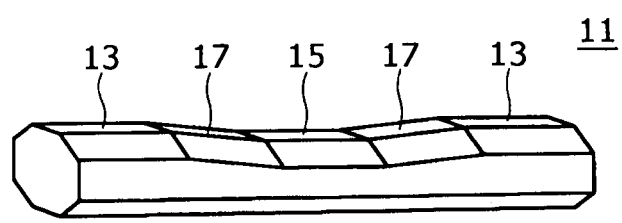

FIG. 18 is a perspective view (like FIG. 13) showing the forging stock pertaining to another embodiment of the present invention.

Figure 19:
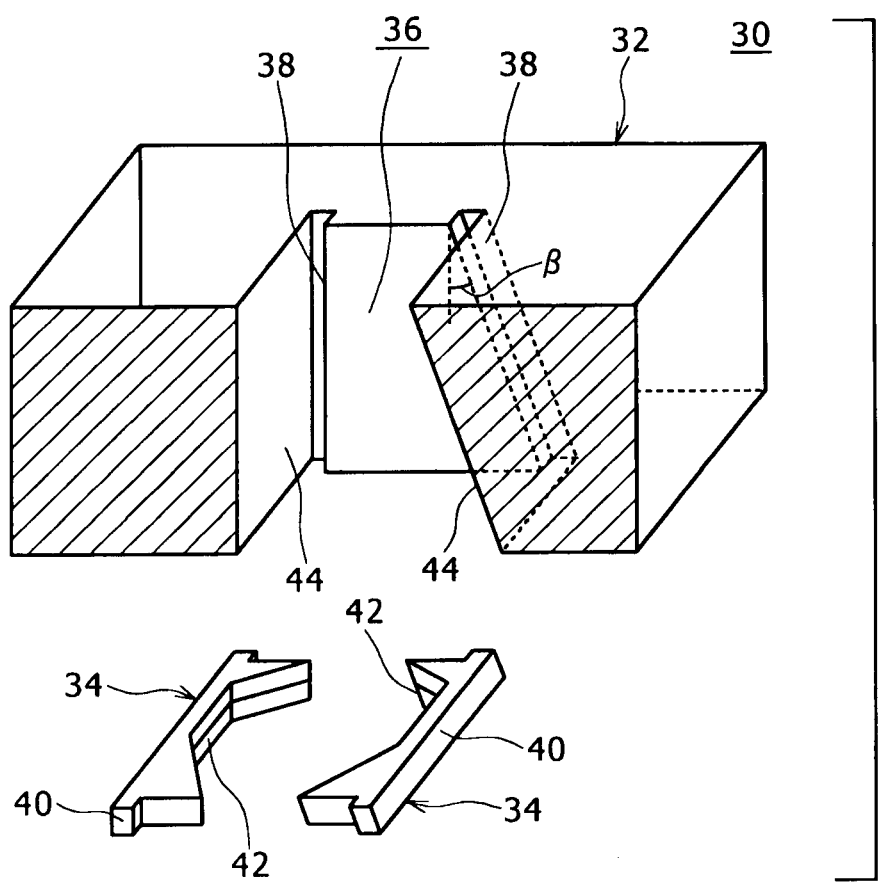

FIG. 19 is a perspective view showing a fixed die and movable dies installed in the apparatus used to form the forging stock.

BEST MODE FOR CARRYING OUT THE INVENTION

The following concerns the best mode for carrying out the invention which is described in detail with reference to the accompanying drawings.

Embodiment 1

Figure 1:
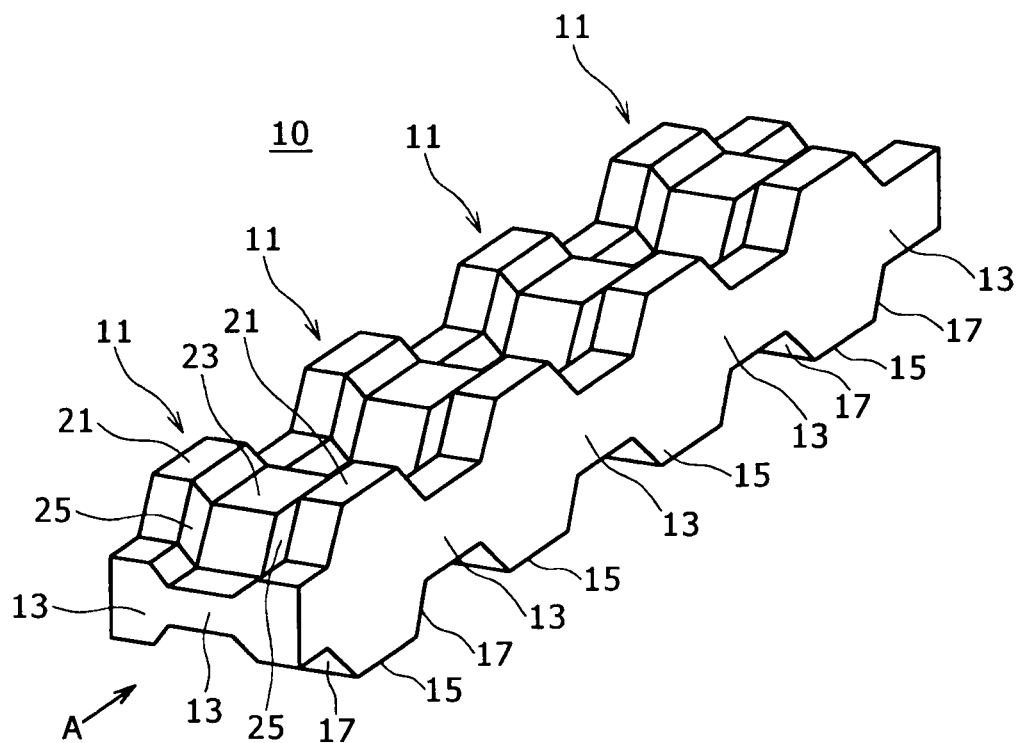
FIG. 1 is a perspective view showing the forging stock pertaining to Embodiment 1 of the present invention.

FIG. 1 is a perspective view showing the forging stock pertaining to Embodiment 1 of the present invention. The forging stock 10 (the stock 10 for short hereinafter) is formed by extrusion in the direction of arrow A.

Figure 2:
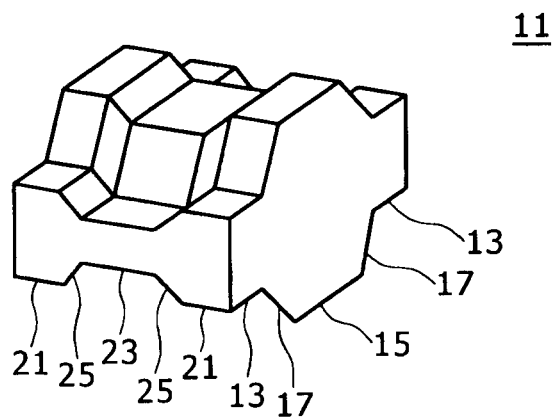
FIG. 2 is a perspective view showing a portion cut from said forging stock.

The stock 10 is cut into a plurality of portions 11 ... 11. In other words, the stock 10 is a continuously formed body consisting of portions 11 ... 11 to undergo forging. FIG. 2 is a perspective view showing a portion 11 cut from the stock. The portion 11 shown in FIG. 2 undergoes forging by means of a forging press.

The portion 11 has a pair of first parallel parts 13 and 13, a second parallel part 15 (differing in thickness from said first parallel parts 13 and 13), and a pair of oblique parts 17 and 17. All of these parts are arranged parallel to the direction of extrusion. To be specific, the first parallel parts 13 and 13 are at both ends along the direction of extrusion, the second parallel part 15 is between the first parallel parts 13 and 13, and the oblique parts 17 and 17 are between the first parallel parts 13 and 13 and the second parallel part 15.

The first parallel parts 13 and 13 and the second parallel part 15 have a uniform thickness along the direction of extrusion, and the oblique parts 17 and 17 vary in thickness along the direction of extrusion. The oblique parts 17 and 17 are formed such that they are as thick as the first parallel part 13 at their ends joining the first parallel parts and also as thick as the second parallel part 15 at their ends joining the second parallel part.

Figure 3:
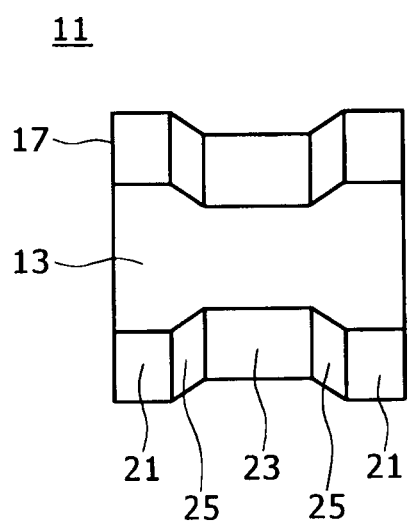
FIG. 3 is a front view showing a portion of said forging stock.

In this embodiment, the second parallel part 15 is thicker than the first parallel parts 13 and 13. The oblique parts 17 and 17 and the second parallel part 15 have a hexagonal cross section viewed in the widthwise direction. Incidentally, "thickness" as used herein means the thickness in vertical direction shown in FIG. 3. The distance along the horizontal direction in FIG. 3 is referred to as width in the cross section perpendicular to the direction of extrusion.

The portion 11 is so formed as to be uniform in width but varied in thickness along the direction of extrusion as mentioned above. In other words, the portion 11 has a cross section which continually varies in one direction (or the vertical direction in FIG. 3) perpendicular to the direction of extrusion, or the portion 11 has a cross section which changes along the direction of extrusion. The top shown in FIG. 3 is surrounded by edge lines perpendicular to the direction of extrusion, and the edge lines remain unchanged along the direction of extrusion. Likewise, the bottom in FIG. 3 is surrounded by edge lines perpendicular to the direction of extrusion, and the edge lines remain unchanged along the direction of extrusion. The portion 11 is formed such that the edge lines mentioned above move up and down while keeping their configuration in going along the direction of extrusion. The fact that the cross section changes only in one direction (vertical direction) is due to the method of extrusion mentioned later.

On the other hand, the portion 11 has (in any cross section perpendicular to the direction of extrusion) thick parts 21 and 21, thin part 23, and transitional parts 25 and 25 which vary in thickness along the widthwise direction. The thick parts 21 and 21 are at both ends in the widthwise direction, and between them is the thin part 23. The transitional parts 25 and 25 are formed between the thick parts 21 and 21 and the thin part 23 such that the thickness is gradually changes along the widthwise direction. Therefore, the cross section perpendicular to the direction of extrusion consists of thick end parts and a thin intermediate part. In addition, the portion 11 is symmetrical about the horizontal axis.

The stock 10 mentioned above is of light metal. To be specific, the light metal is an aluminum alloy designated as JIS 4000, which includes, for example, alloy No. 4032. This aluminum alloy is one with a high silicon content suitable for swaging. It is more ductile than a cast stock of the same material. Therefore, it easily undergoes deformation processing.

The following illustrates the forming apparatus 30 for the stock 10 with reference to FIGS. 4(a) to 4(d), which schematically show the important parts thereof. As shown in these figures, the forming apparatus 30 has a fixed die 32 and a pair of movable dies 34 and 34.

The fixed die 32, which is firmly attached to one end of a billet container (not shown), has a forming hole 36 that extends in the direction of extrusion. The forming hole 36 is so shaped as to change in cross section in going in the direction of extrusion. That is, the cross section perpendicular to the direction of extrusion has a width which remains constant in direction Y in FIG. 4(a) and a width which gradually increases in direction X in FIG. 4(a).

The forming hole 36 has guide grooves 38 and 38 which guide the movable dies 34 and 34. The guide grooves 38 and 38 are arranged at the ends (in direction Y) of the forming hole 36. The guide grooves 38 and 38 correspond to the movable dies 34 and 34, respectively. The guide grooves 38 and 38 are oblique such that their distance gradually increases in going in the direction of extrusion. The guide grooves 38 and 38 each have the same oblique angle (.alpha.) to the direction of extrusion.

Figure 4:
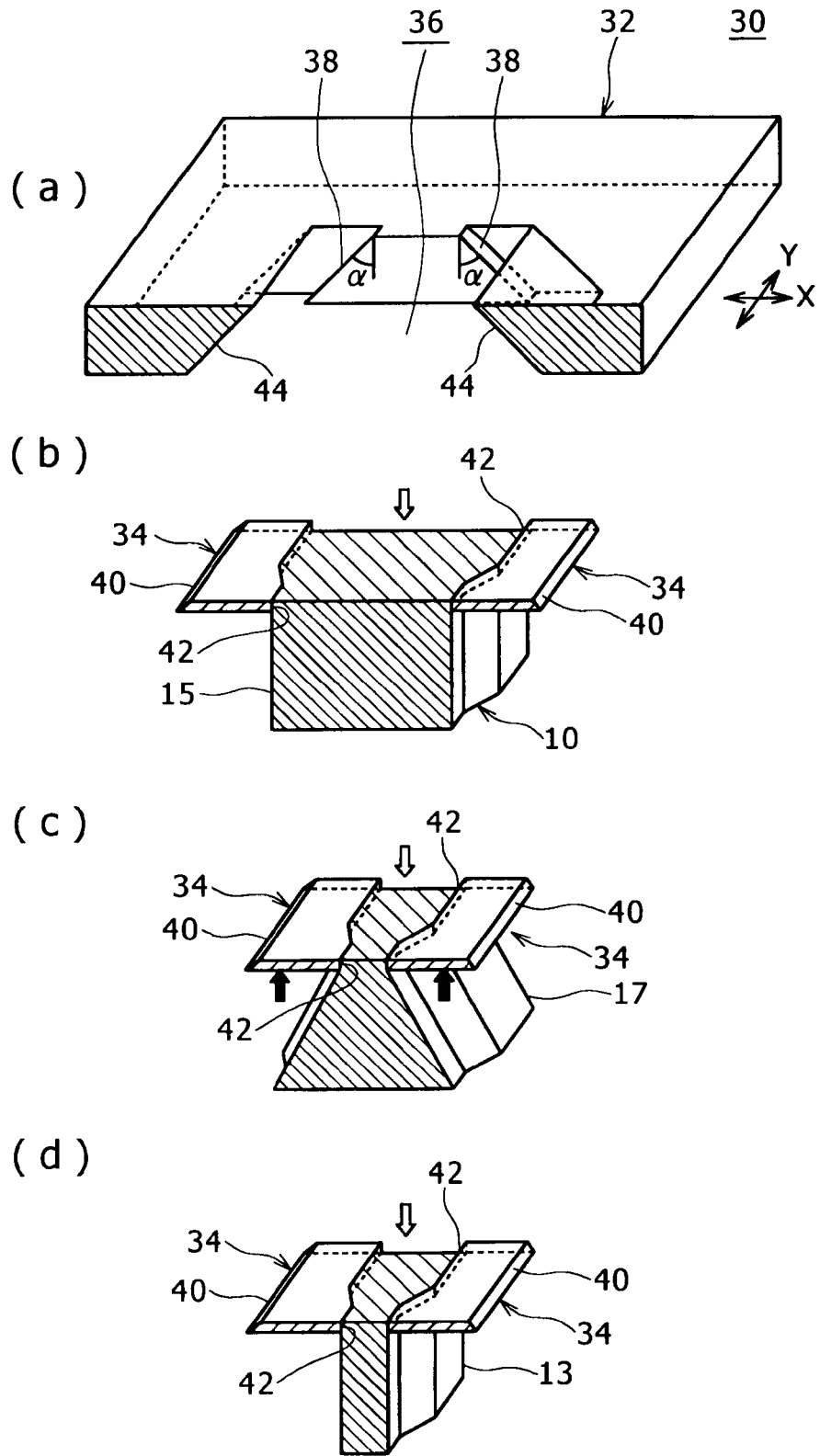
FIG. 4 is a conceptual diagram showing an important part of the apparatus used to form said forging stock and also showing how forming is accomplished, (a) illustrating a fixed die (in perspective view), (b) illustrating a second parallel part being extruded, (c) illustrating an oblique part being extruded, and (d) illustrating a first parallel part being extruded.

There are two movable dies 34 and 34, which are symmetrically arranged, as shown in FIGS. 4(b) to 4(d). Each of the movable dies 34 and 34 is shaped flat and has the sliding face 40 and the forming face 42. The movable dies 34 and 34 are placed in the forming hole 36 of the fixed die 32 such that they lie at right angles to the direction of extrusion, and they are fitted into the guide grooves 38 and 38 of the fixed die 32. The movable dies 34 and 34 face each other in a direction perpendicular to the direction of extrusion, so that they permit the stock 10 to be extruded straight. In this state, the sliding face 40 of the movable die 34 slides on the guide face 44 of the forming hole 36, and the movable die 34 moves along the guide groove 38 in a direction oblique to the direction of extrusion. The sliding face 40 is oblique to the forming face 42, and the oblique angle is equal to that (to the direction of extrusion) of the guide face 44. The forming faces 42 and 42 of the movable dies 34 and 34 face each other parallel to the direction of extrusion. The gap between the forming faces 42 and 42 permits the billet to pass through or to be extruded into the stock 10.

The movable dies 34 and 34 are driven by a drive mechanism (not shown), which is so constructed as to move the movable dies 34 and 34 simultaneously while keeping them facing each other in the direction perpendicular to the direction of extrusion.

The forming apparatus 30 is operated in the following way to form the stock 10. First, the container is charged with a billet of aluminum alloy. The billet is extruded by a stem (not shown) from the container into the forming hole 36. The billet is supplied to the forming hole 36 from above (FIG. 4(a)) and extruded in the direction of hollow arrow (FIG. 4(b)).

During extrusion, the movable dies 34 and 34 are moved (driven) up and down along the guide grooves 38 and 38. When the movable dies 34 and 34 are positioned (away from each other) at the downstream end of the guide grooves 38 and 38, the second parallel part 15 (which is thick) is extruded from the forming hole 36. As shown in FIG. 4(c), as the movable dies 34 and 34 are moved upstream by the drive mechanism while extrusion is going on, the gap between the movable dies 34 and 34 gradually decreases, with the result that the stock 10 being extruded gets thin accordingly. Thus the oblique part 17 is formed.

Then, the movable dies 34 and 34 are positioned at the upstream end of the guide grooves 38 and 38 as shown in FIG. 4(d), so that the first parallel part 13 of the stock 10 (which is thin and has a uniform thickness) is extruded. The foregoing steps are repeated to extrude the stock 10 shown in FIG. 1.

Figure 5:
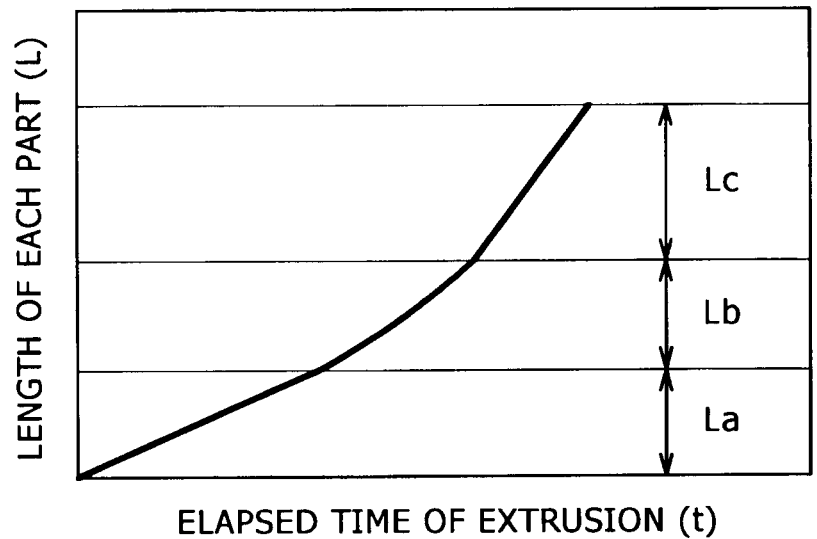
FIG. 5 is a graph showing the relation between the elapsed time of extrusion and the length of each part, which is observed when said forging stock is extruded.

During extrusion, the stem is moved at a constant rate. Therefore, if the gap between the movable dies 34 and 34 are held constant, the stock 10 is extruded at a constant rate as shown in FIG. 5. Therefore, the length of the stock 10 extruded can be calculated from the time of extrusion, and hence the time of extrusion is used to control the timing to start moving the movable dies 34 and 34. In addition, when the movable dies 34 and 34 are moved gradually, the amount of movement determines the amount of extrusion. Thus it is possible to calculate the moving rate of the movable dies 34 and 34 according to the oblique angle of the oblique parts 17 and 17. This in turn makes it possible to obtain the desired length by controlling the moving rate of the movable dies 34 and 34. Incidentally, La, Lb, and Lc in FIG. 5 correspond respectively to the length of the second parallel part 15, the length of the oblique parts 17 and 17, and the length of the first parallel parts 13 and 13, measured in the direction of extrusion.

Figure 6:
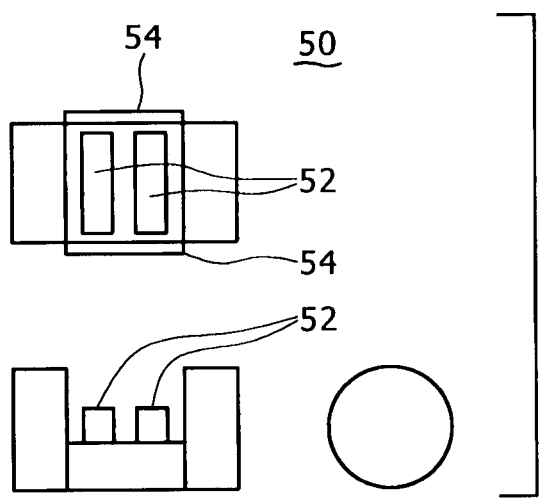
FIG. 6 illustrates a forged product in front view, plan view, and side view.

The stock 10 thus obtained is made by forging into a forged product 50 as shown in FIG. 6. This forged product 50 has thick discoid parts at both ends and a thin part held between them, which has rib-like parts 52. The lengthwise direction of the forged part 50 is perpendicular to the direction of extrusion. Forging to produce this forged product 50 gives rise to only a small amount of burr 54 as shown in FIG. 6.

As mentioned above, the stock 10 pertaining to Embodiment 1 is formed by extrusion. Extrusion allows efficient and economical production of the stock 10 having cross sections (perpendicular to the direction of extrusion) varying along the direction of extrusion. The stock 10 with varying cross sections has a shape resembling the forged product 50. Therefore, forging on the stock 10 can be accomplished in high yields with a small amount of burr. This leads to efficient production and forging of the stock 10 and makes it possible to form the thin part 23 at the time of forging.

Embodiment 1 is intended such that the extrudate is divided into discrete parts 11, each of which is used as the stock 10 for forging. Thus it is possible to produce the stock 10 one by one continuously and efficiently. Each of the discrete parts 11 allows efficient forging with a small amount of burr.

Embodiment 1 is also intended such that the forged product 50 has the lengthwise direction parallel to the cross section perpendicular to the direction of extrusion. Thus the forged product 50 may vary in thickness in this direction. The stock 10 can be extruded in the direction perpendicular to the lengthwise direction of the forged product 50. In this way it is possible to improve the efficiency of extrusion of the stock 10 for the forged product 50 in elongated thin shape.

The forming apparatus 30 according to Embodiment 1 is designed such that the movable dies 34 and 34 are moved when the stock 10 is formed by extrusion. The resulting extrudate has cross sections (perpendicular to the direction of extrusion) varying along the direction of extrusion. In addition, the forming apparatus 30 is designed such that the movable dies 34 and 34 are moved obliquely with respect to the direction of extrusion. This design does not need sealing unlike conventional movable dies to be moved in the direction perpendicular to the direction of extrusion. Therefore, this design permits the movable dies 34 and 34 to slide on the fixed die 32 with a minimum of wear. The movable dies 34 and 34, which are arranged in the direction perpendicular to the direction of extrusion, permit the stock 10 to be extruded straight, which contributes to the dimensional accuracy of the stock 10.

Although Embodiment 1 is intended to produce an extrudate which is divided into discrete parts 11 . . . 11 (each serving as the stock 10), it may be so modified as to extrude a single forging stock.

Figure 7:
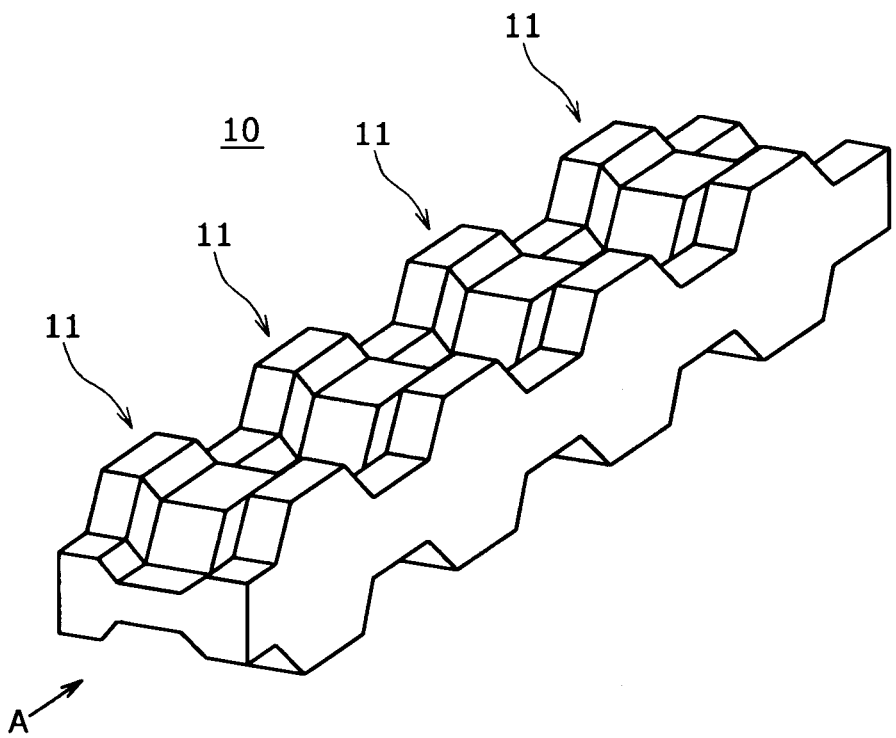
FIG. 7 is a perspective view (like FIG. 1) showing the forging stock pertaining to another embodiment of the present invention.
Figure 8:
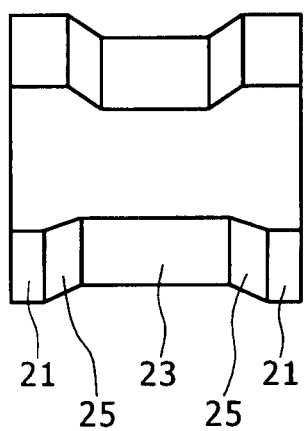
FIG. 8 is a front view showing the forging stock pertaining to another embodiment of the present invention.
Figure 9:
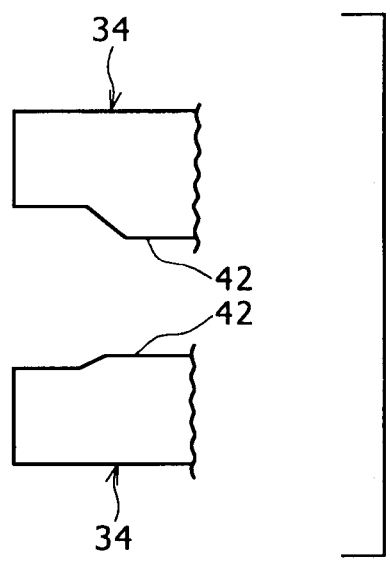
FIG. 9 is a diagram showing the movable die used to extrude the forging stock.

According to Embodiment 1, the stock 10 is constructed such that the step between each of the thick parts 21 and 21 and the thin part 23 is the same in both the upper part and the lower part. However, this construction may be modified such that the step is different between the upper part and the lower part as shown in FIGS. 7 and 8. To be specific, Embodiment 1 in its original form employs a pair of symmetrical movable dies 34 and 34 so that the step is the same in both the upper part and the lower part; however, Embodiment 1 in its modified form employs a pair of unsymmetrical dies 34 and 34 (as shown in FIG. 9) so that the step in the stock 10 is different between the upper part and the lower part. The movable dies 34 and 34 in the latter case differ from each other in the shape (step) of the forming faces 42 and 42. The same fixed die 32 as shown in FIG. 4(a) can be used for the unsymmetrical dies 34 and 34.

Figure 10:
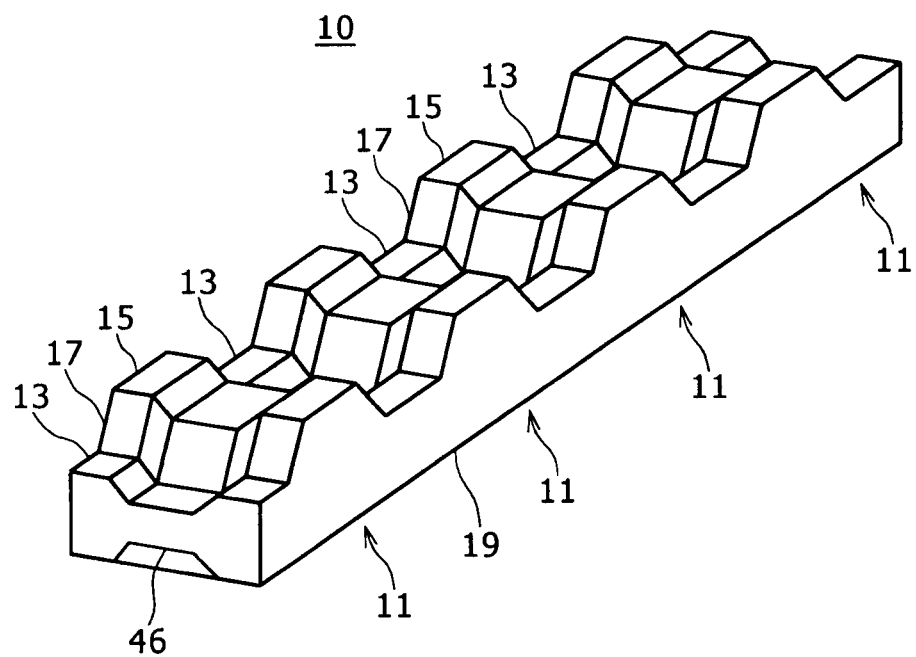
FIG. 10 is a perspective view (like FIG. 1) showing the forging stock pertaining to another embodiment of the present invention.
Figure 11:
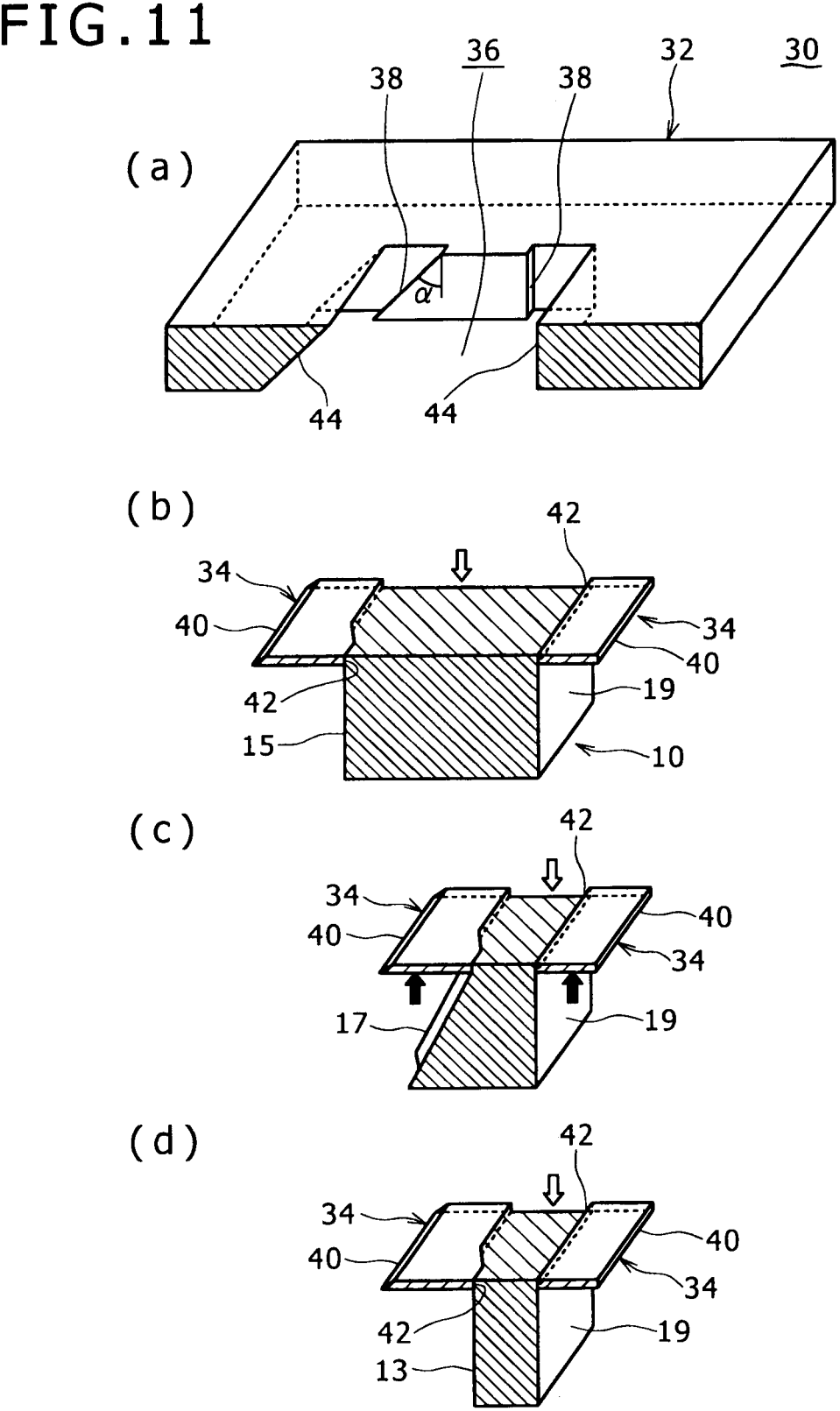
FIG. 11 is a conceptual diagram showing an important part of the apparatus used to form said forging stock and also showing how forming is accomplished, (a) illustrating a fixed die (in perspective view), (b) illustrating a second parallel part being extruded, (c) illustrating an oblique part being extruded, and (d) illustrating a first parallel part being extruded.

The stock 10 in Embodiment 1 in its modified form may be formed such that its upper surface is rugged (as in the case of Embodiment 1 in its original form) but its lower surface is flat, as shown in FIG. 10. To be specific, the stock 10 has a pair of the first parallel parts 13 and 13, the second part 15 (which differs in thickness from the first parallel parts 13 and 13), and a pair of the oblique parts 17 and 17, all of which have the common lower surface which is flat. Thus, the upper surface of the stock 10 has the same shape as that of the stock 10 in Embodiment 1 in its original form.

The stock 10 in the above-mentioned shape can be extruded by using the fixed die 32 and the movable dies 34 and 34 as shown in FIGS. 11(a) to 11(d). The fixed die has two guide grooves 38 and 38. One of them is constructed in the same way as in Embodiment 1 (in its original form mentioned above) and the other of them is parallel to the direction of extrusion. The paired movable dies 34 and 34 differ in shape from each other. One of them is identical with that in Embodiment 1 (in its original form mentioned above) and the other of them has the sliding face 40 and the forming face 42 which are parallel to each other. When the latter fitted into the guide groove 38, the sliding face 40 and the forming face 42 are parallel to the direction of extrusion. The forming face 42 (in the latter case), which is flat, forms the lower surface of the stock 10. As an alternative, the movable die 34 to be fitted into the guide groove 38 parallel to the direction of extrusion may be replaced by a die which has the same length as the fixed die 32 in the direction of extrusion and which does not move in the direction of extrusion.

Incidentally, the second movable die 34 may have its forming face 42 formed in stepped shape as in Embodiment 1 in its original form, so that the resulting stock 10 has the hollow part 46 at the center (in the widthwise direction) on its lower surface, as indicated by a dotted line in FIG. 10. The hollow part 46 extends continuously with a constant depth in the direction of extrusion.

Embodiment 2

Figure 12:
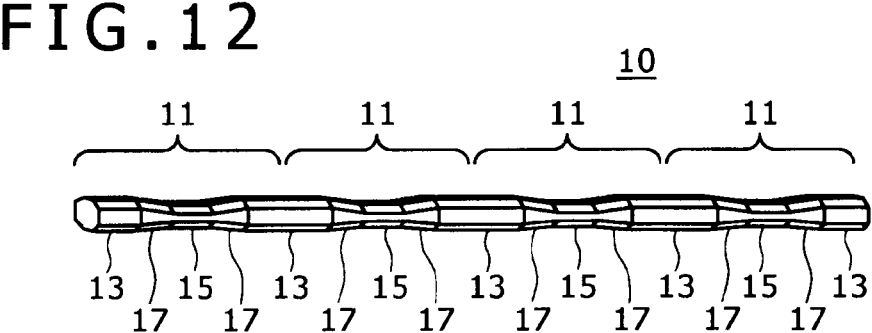
FIG. 12 is a perspective view showing the forging stock pertaining to Embodiment 2 of the present invention.

FIG. 12 is a perspective view showing the stock 10 pertaining to embodiment 2. The stock 10 differs from that in Embodiment 1. It is formed by extrusion in such a way that the direction of extrusion coincides with the lengthwise direction of the forged product 50. In the following about the stock 10, constituents common in Embodiments 1 and 2 are named alike without repetition of their description.

Figure 13:
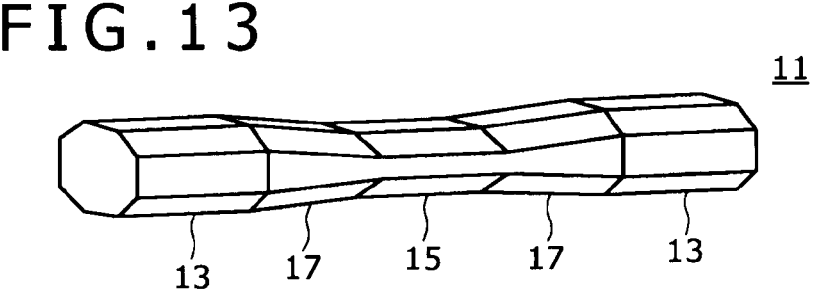
FIG. 13 is a perspective view showing a portion of said forging stock.

The stock 10 pertaining to Embodiment 2 is cut into a plurality of portions 11 . . . 11, which subsequently undergo forging individually. One of the cut portions 11 . . . 11 is illustrated in FIG. 13. It has a pair of first parallel parts 13 and 13, a second parallel part 15 (differing in thickness from said first parallel parts 13 and 13), and a pair of oblique parts 17 and 17. The first parallel parts 13 and 13 are at both ends in the direction of extrusion, the second parallel part 15 is between the first parallel parts 13 and 13, and the oblique parts 17 and 17 are between the first parallel parts 13 and 13 and the second parallel part 15.

The first parallel parts 13 and 13 and the second parallel part 15 have a uniform thickness along the direction of extrusion, and the latter is thinner than the former. The first parallel parts 13 and 13, the second parallel part 15, and the oblique parts 17 and 17 all have an octagonal cross section perpendicular to the direction of extrusion.

The stock 10 is of light metal. To be specific, the light metal is an aluminum alloy designated as JIS 4000, which includes, for example, alloy No. 4032. This aluminum alloy is one with a high silicon content suitable for swaging. It is more ductile than a cast stock of the same material. Therefore, it easily undergoes deformation processing.

Figure 14:
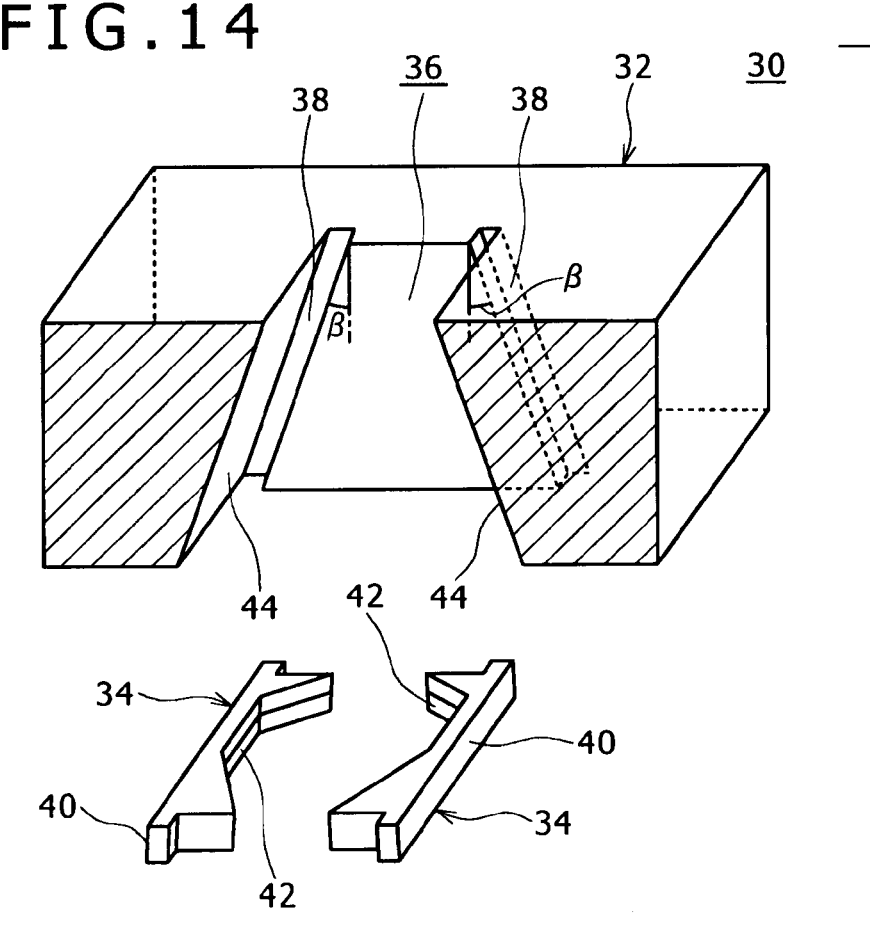
FIG. 14 is a perspective view showing a fixed die and movable dies installed in the apparatus used to form the forging stock.

FIG. 14 shows the apparatus 30 used to form by extrusion the stock 10 pertaining to Embodiment 2. The apparatus 30 has a fixed die 32 and a pair of movable dies 34 and 34. The fixed die 32 has a forming hole 36 which gradually widens along the direction of extrusion. The forming hole 36 has a pair of guide grooves 38 and 38, which are inclined an angle of .beta. equally to the direction of extrusion. Into the guide grooves 38 and 38 are fitted the movable dies 34 and 34, so that the former permit the latter to move along them. As the movable dies 34 and 34 move, their sliding faces 40 and 40 slide on the guide faces 44 and 44 of the forming hole 36, so that the billet passes through the opening between the forming faces 42 and 42 to give the extruded stock 10. The movable dies 34 and 34 are shaped symmetrically.

Figure 15:
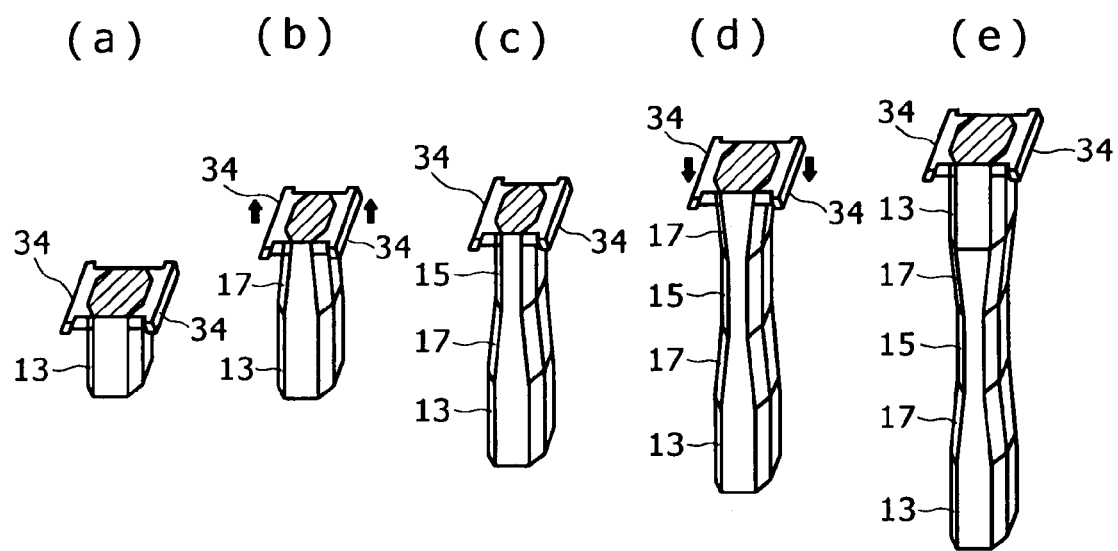
FIG. 15 is a diagram showing the process of forming the forging stock, (a) illustrating a first parallel part being extruded, (b) illustrating an oblique part being extruded, (c)

During extrusion, the movable dies 34 and 34 move as shown in FIGS. 15(a) to 15(e). The movable dies 34 and 34 positioned at the downstream end of the forming hole 36 as shown in FIG. 15(a) form the first parallel part 13 which is uniformly thick. Having moved upstream as shown in FIG. 15(b), the movable dies 34 and 34 form the oblique part 17. The resulting stock 10 has a cross section symmetrical to its axis because the guide grooves 38 and 38 are equally inclined an angle of .beta. With their position remaining at the upstream end as shown in FIG. 15(c), the movable dies 34 and 34 form the second parallel part 15 which is uniformly thick. Having moved downstream as shown in FIG. 15(d), the movable dies 34 and 34 form the oblique part 17. Having returned to the downstream end as shown in FIG. 15(e), the movable dies 34 and 34 form the first parallel parts 13 and 13. Extrusion with the foregoing steps repeated gives rise to the stock 10.

The stock 10 thus obtained can be forged into a forged product 50 shown in FIG. 6. Forging in this case is carried out (unlike forging in Embodiment 1) in such a way that the lengthwise direction of the stock 10 coincides with that of the forged product 50.

The fact that the direction of extrusion coincides with the lengthwise direction of the forged product 50 is the advantage of Embodiment 2 that the directionality of the stock contributes to the lengthwise characteristics of the forged product 50.

Incidentally, Embodiment 2 is intended to produce the stock 10 which is symmetrical with respect to its axis. However, the stock 10 may also be shaped such that the oblique parts 17 and 17 are inclined differently in the thickness direction (or the vertical direction) as shown in FIG. 16. The stock 10 shaped in this manner is obtained by using the fixed die 32 whose forming hole 36 has the guide grooves 38 and 38 differing in oblique angle as shown in FIG. 17. Into the guide grooves 38 and 38 are fitted the paired movable dies 34 and 34 whose sliding faces 40 and 40 have different oblique angles indicated by β and γ. The movable dies 34 and 34 are driven in the same way as that of the embodiment 2.

The oblique parts 17 and 17 may be shaped such that one side is oblique to the axis and the other side is not oblique, as shown in FIG. 18. The stock 10 in such a modified shape may be formed by using the fixed die 32 as shown in FIG. 19. The fixed die 32 has the guide grooves 38 and 38, one of which is parallel to the direction of extrusion and the other of which is oblique at an angle of .beta. to the direction of extrusion. The fixed die 32 also has the guide faces 44 and 44 along which the sliding faces 40 and 40 of the movable dies 34 and 34 move. In this case, the movable die 34 fitting into the guide groove 38 parallel to the direction of extrusion may be replaced by a stationary die which is as long as the fixed die 32 in the direction of extrusion. The fixed die 32 modified in this manner has only one guide groove 38 at the right side. Embodiment 2 is identical with Embodiment 1 in structure, functions, and effects whose description is omitted.

SUMMARY OF THE INVENTION

The present invention is summarized as follows.
(1) The present invention permits a forging stock to be formed by extrusion economically and efficiently. The resulting forging stock varies in cross section perpendicular to the direction of extrusion. The forging stock with varied cross sections closely resembles the forged product in shape, and hence it can be forged in high yields with a minimum amount of burr. This contributes to efficient stock production and efficient forging. Thus, the present invention provides forging stocks capable of economical and efficient forging. (2) The forging stock mentioned above should preferably be cut into portions (in the direction of extrusion) to be forged individually. Each cut portion should preferably have cross sections varying along the direction of extrusion.

In this way the forging stocks can be produced continuously and efficiently by extrusion. Each forging stock can be forged in high yields with a minimum of burr.

(3) Each cut fraction mentioned above may have a pair of parallel parts at both ends thereof in the direction of extrusion, a second parallel part which is between said first parallel parts and which differs in thickness from said first parallel parts, and oblique parts each of which is between said first parallel parts and said second parallel part. (4) The forging stock mentioned above may be formed in such a way that the width remains constant along the direction of extrusion and the thickness varies along the direction of extrusion for the thick part, thin part, and transitional part between them.

The forging stock formed in this manner may be forged in such a way that the direction along the cross section coincides with the lengthwise direction of the forged product. The resulting forged product varies in thickness along the lengthwise direction. Forging in this manner causes the stock to be extruded in the direction perpendicular to the lengthwise direction of the forged product. Thus the forging stock for a forged product in thin long shape can be produced efficiently by extrusion.

(5) The forging stock mentioned above may be of light metal. (6) The present invention covers a forged product obtained by forging from the forging stock mentioned above. (7) The present invention covers an apparatus for forming the forging stock mentioned above. The apparatus consists of a fixed die, movable dies, and a drive mechanism. The fixed die has a forming hole provided with guide grooves extending obliquely to the direction of extrusion. The movable dies are arranged in the forming hole, and each of them has a forming face. The drive mechanism moves the movable dies along the guide grooves.

The forming apparatus according to the present invention works in such a way that the movable dies move while the forging stock is being extruded, so that the forging stock varies in cross section (perpendicular to the direction of extrusion) along the direction of extrusion. In addition, the movable dies move obliquely to the direction of extrusion. This structure obviates the necessity of applying sealing force to the movable dies unlike the conventional structure in which the movable dies move in the direction perpendicular to the direction of extrusion. This protects the movable dies sliding on the fixed die from wearing. (8) The present invention covers a method for forming the forging stock mentioned above. The method employs a fixed die and movable dies. The fixed die has a forming hole having guide grooves extending in the direction oblique to the direction of extrusion. The movable dies, each having a forming face, are arranged in the forming hole. During extrusion, the movable dies move along the guide grooves. Extrusion in this manner gives the forging stock (mentioned above) whose cross section perpendicular to the direction of extrusion varies along the direction of extrusion.

EXPLOITATION IN INDUSTRY

The present invention is useful in the field of forging.

The invention claimed is:
1. A method of forming a forged product having thick end parts and a thin part between the thick parts, comprising the steps of:
   extruding a forging stock such that the cross section of the forging stock varies along the direction of extrusion to provide alternating thick parts and thin parts along the direction of extrusion;
   cutting said forging stock at each of said thick parts and in the direction perpendicular to the direction of extrusion, to form cut portions, each of which has two thick end parts, a thin part intermediate the end parts and transitional parts with varying thickness between the thin part and each of the thick end parts; and
   forging each of the cut portions such that the thick end parts of the cut portions form the thick end parts of the forged product and the thin part of the cut portions forms the thin part of the forged product.

* * * * *